Jan. 22, 1924.
J. F. CALDWELL
1,481,686
PLASTIC MOLDING MACHINE
Filed April 14, 1923   4 Sheets-Sheet 4
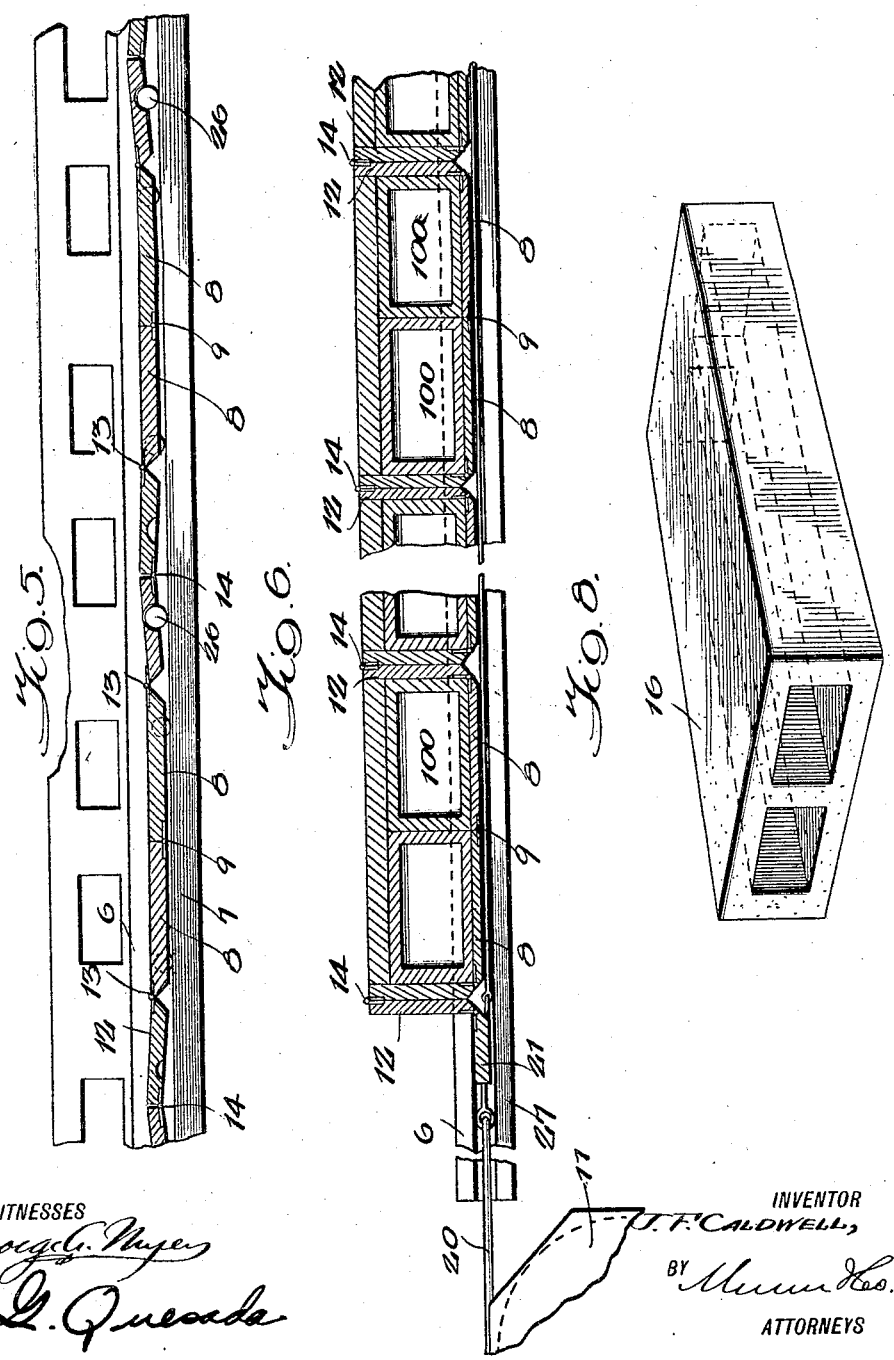

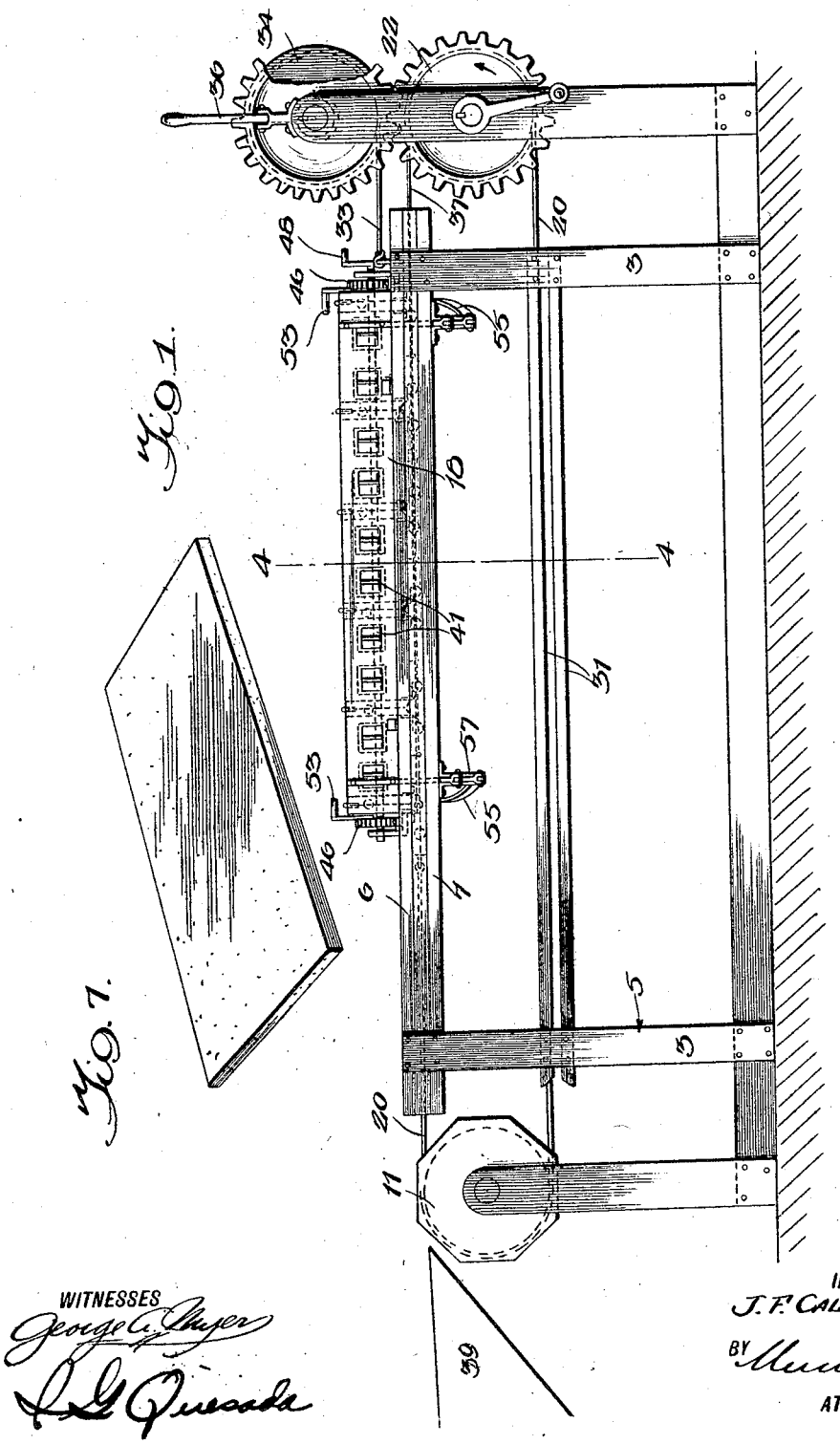

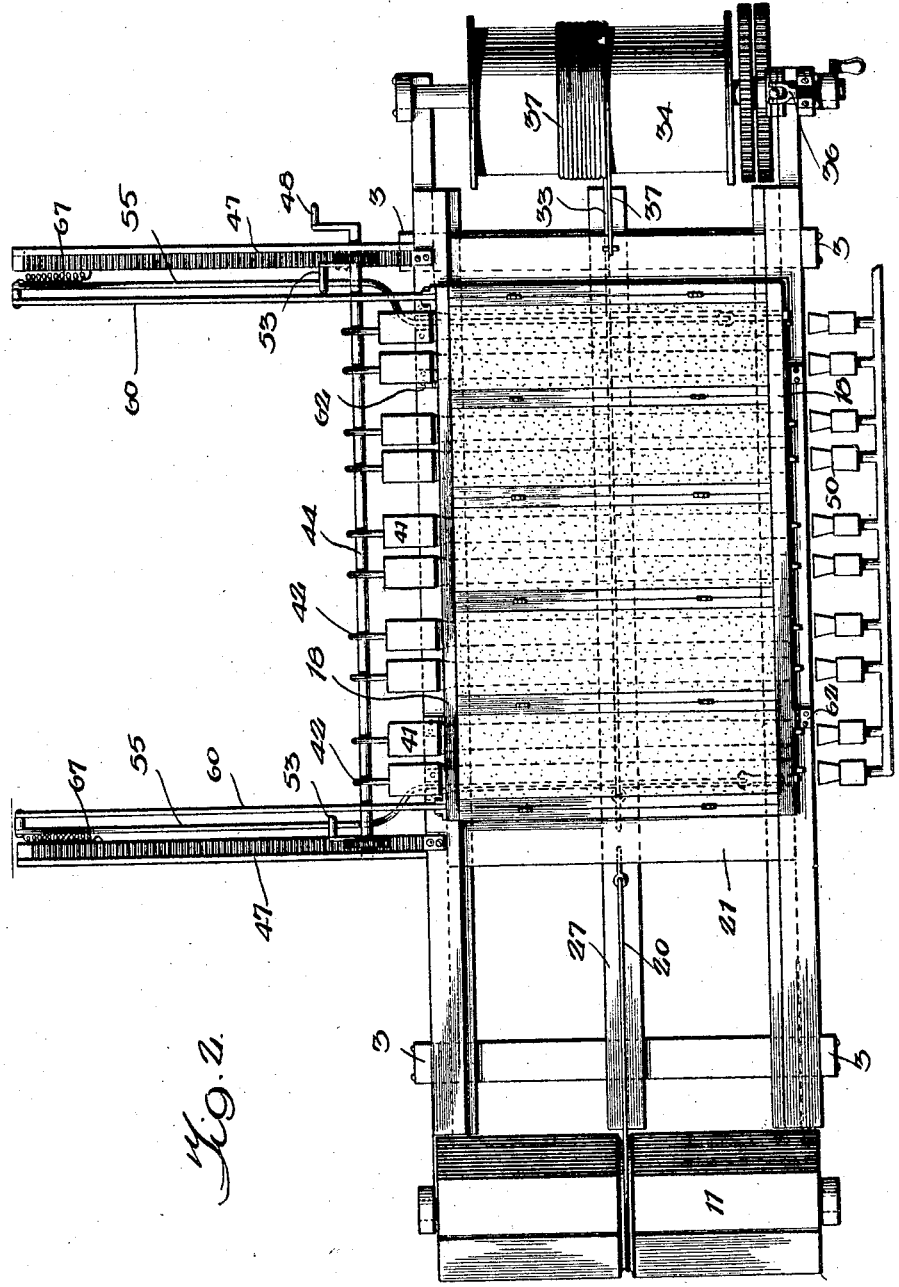

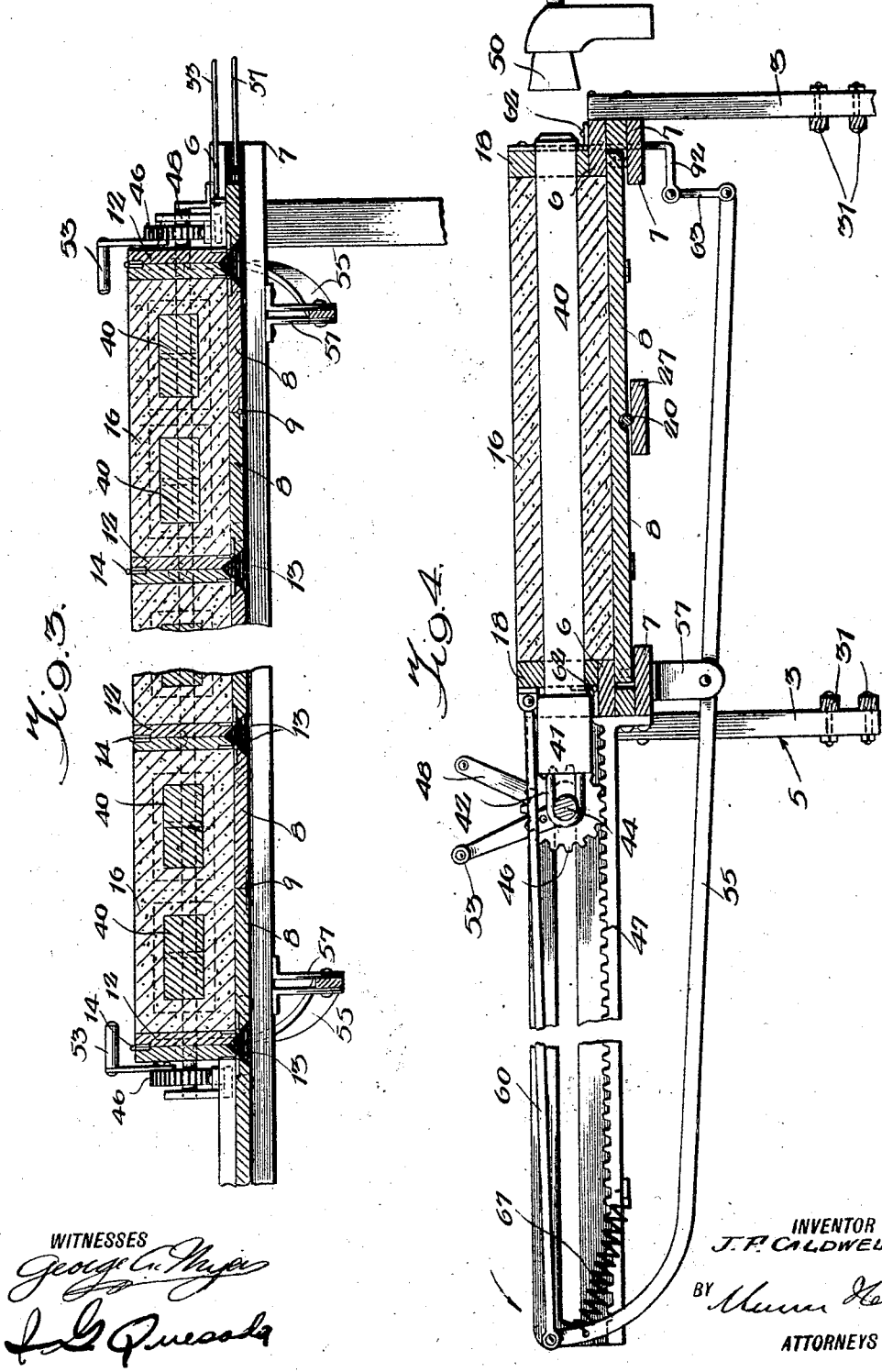

Patented Jan. 22, 1924.

1,481,686

UNITED STATES PATENT OFFICE.

JAMES FREDRICK CALDWELL, OF LOS ANGELES, CALIFORNIA.

PLASTIC MOLDING MACHINE.

Application filed April 14, 1923. Serial No. 632,087.

*To all whom it may concern:*

Be it known that I, JAMES FREDRICK CALDWELL, a citizen of the United States, and resident of Los Angeles, in the county of Los Angeles and State of California, have invented certain new and useful Improvements in Plastic Molding Machines, of which the following is a specification.

Briefly stated an important object of this invention is to provide a molding machine having simple and reliable means whereby the cores and side and end walls of the form may be moved to their inoperative positions subsequent to forming the blocks or boards so that the blocks or boards as the case may be, may be conveniently removed to a suitable place.

A further object is to provide a molding machine of the character specified having simple and reliable means whereby the operative parts thereof may be set up for use.

A further object of the invention is to provide a molding machine of the character specified which is of highly simplified construction, durable in use and cheap to manufacture.

Other objects and advantages of the invention will be apparent during the course of the following description.

In the accompanying drawings forming a part of this application and in which like numerals are employed to designate like parts throughout the same.

Figure 1 is a side elevation of the improved machine set up for use.

Figure 2 is a plan view of the same.

Figure 3 is a detail longitudinal sectional view through the machine set up for use.

Figure 4 is a vertical transverse sectional view taken on line 4—4 of Figure 1.

Figure 5 is a detail longitudinal section through the machine illustrating the side walls collapsed.

Figure 6 is a detail section illustrating the machine employed for use in making plaster boards.

Figure 7 is a perspective of a plaster board made by the machine.

Figure 8 is a perspective of a block manufactured by the improved machine.

In the drawing wherein for the purpose of illustration is shown a preferred embodiment of the invention the numeral 5 generally designates the frame of the machine, and the said frame consists of a plurality of legs 3 to which upper and lower longitudinally extending guide strips 6 and 7 are connected. The guide strips 6 and 7 are arranged in pairs, the guide strip 6 being arranged above the strip 7 and in spaced relation thereto, whereby to form grooves to slidably receive the transversely extending bottom walls or plates 8 of the molding mechanism. Figure 3 illustrates that the bottom plates 8 are arranged in pairs and are connected at their opposed longitudinal edges by pairs of hinges 9 so that the plates may move about and flatly contact with the surface of a polygonal drum 11. This, however, occurs when it is desired to discharge the molded blocks or boards as the case may be.

In carrying out the invention the pairs of bottom plates or walls 8 are connected along their outer edges to pairs of side walls 12 through the medium of hinges 13 and it will be seen with reference to Figure 3 that the side walls have their opposed surfaces flatly in contact with each other and have their opposed edges hingedly connected as indicated at 14. This arrangement permits the walls 12 to be positioned vertically as illustrated in Figure 3 or in a nearly horizontal position, as illustrated in Figure 5.

When the machine is set for the reception of the plastic by which the blocks 16 are formed the side walls 12 are arranged on edge or vertically and cooperate with the bottom walls or plates 8 and the hinged end walls 18 in forming compartments for the reception of the plastic from which the block is formed.

When the machine is set up as illustrated in Figure 2 the plastic is of course, introduced into the battery of compartments and after the blocks have been formed by tamping or otherwise, a cable 20 connected to an end plate 21 is drawn about the polygonal drum 11 and is wound about a drum 22. That is to say, the drum 22 is rotated in an anti-clockwise direction and the cable 20 is wound thereon for moving the bottom plates 8 and the side walls 12 longitudinally of the machine. It will be seen that the bottom plates 8 have their ends received in the slots or grooves formed by the guide strips 6 and 7 and the guide strips cooperate to hold the plate 8 in position. However, the side walls 12 when positioned as illustrated in Figure 5 do not extend into the grooves formed by the strips 6 and 7, but their intermediate portions are formed with rollers 26 which contact with a central supporting track 27. The rollers 26 when in engagement with the track 27 prevent the side walls 12 from assuming a horizontal position and consequently it is a simple matter to return the side walls to their vertical positions as illustrated in Figure 3. This return of the side walls 12 to vertical positions is accomplished by a means to be more fully hereinafter described.

When the plates 8 which support the block are moved along the top of the frame first one of the plates 8 and then the other plate 8 of a particular pair move onto the polygonal drum and the blocks are discharged onto a suitable receiver 30 and conveyed to a suitable point. It will be seen that the bottom wall of each compartment is formed of two sections hingedly connected and one of the sections is removed from supporting contact with the bottom of the block before the other section so as to reduce the possibility of cracking the block to a minimum.

As the plates 8 and 12 pass about the drum 11 the ends of the plates are received in grooves formed by spaced guide strips 31 connected to the legs 6.

Figures 1 and 2 illustrate that a return cable 33 is trained about and is connected to a return roller 34 arranged immediately above the drum or roller 22. The drum 34 is caused to rotate in a counter-clockwise direction for the purpose of returning the plates or sections 8 and 12 to the top of the machine. More specifically when the roller or drum 34 is rotated in a counter-clockwise direction the plates 8 assume horizontal positions on top of the frame and the partition members 12 assume the slightly inclined position as illustrated in Figure 5.

When the bottom walls and partitions have thus been returned to the position illustrated in Figure 5 the drum 34 is released from operative engagement with the drums 22 through the medium of a clutch 36 and the drum 22 is manually rotated so that what might be said to be a set-up cable 37 will draw the partitions 12 to their vertical positions. Figure 2 plainly illustrates that the set-up cable 37 which is trained about the roller has connection with the far end of the series of plates and partitions so that as the same is drawn the length of the series of plates and partitions will decrease and consequently the partitions and bottom walls will assume their operative positions. The cores 40 may be inserted into the compartments.

The cores 40 which are positioned in the compartments preparatory to the filling of the same are formed with heads 41 to which U-bolts 42 are connected. A core-controlled shaft 44 is extended through the several U-bolts 42 and is provided at its end portions with gears 46 mounted upon transversely extending parallel racks 47. The shaft or control member 44 is formed at one end with a crank 48 by means of which the gears may be moved longitudinally of the racks 47. When the crank 48 is rotated in a clockwise direction the cores 40 will of course be withdrawn from the blocks and when the crank is manually rotated in a counter-clockwise direction the cores will be inserted into the compartment.

After the formation of the blocks and preparatory to removing the same to the receiver 30 the reduced ends of the cores which are extended through the side walls are engaged by the striking elements of a plurality of air hammers 50. The air hammers 50 are preferably operated together so as to simultaneously loosen the cores 40. Figure 4 illustrates that the cores are not required to move exactly in unison in response to the action of the air hammers 50 but they may move separately to a limited extent as the U-bolts 42 freely receive the shaft 44. That is to say in case one core is more readily released than the other cores by the air hammers it may move rearwardly a limited extent without reference to the movement of the other cores. In this manner any cores which remain stuck can be struck again by the air hammers.

When the cores have thus been released the crank 48 is rotated in a clockwise direction for withdrawing the cores from the blocks and the end walls 18. As the cores are withdrawn from the blocks contact lugs 53 carried by the gears 46 are engaged with the curved terminal portions of levers 55 pivoted intermediate their ends to brackets 57. The curved terminal portions of the levers 55 are connected through the medium of links 60 to one of the end walls 18 so that when the levers 55 are swung on their pivot through the medium of the lugs 53 one of the end walls 18 is swung outwardly on its hinge 62.

With reference to Figure 4 it will be seen that one end of each lever 55 is connected to an arm 92 through the medium of a link 63 and as the several arms 92 are rigidly connected to one of the end walls 18 the swinging movement of the levers 55 will swing the other end wall 18 outwardly on its hinge. It is thus seen that the engagement of the lugs 53 with the curved terminal portions of the levers 55 will simultaneously swing the end walls 18 outwardly on their hinges so that the blocks may be moved. The lugs 53 force the levers 55 downwardly against the tension of the springs 67 and when the lugs 53 are released from engagement with the levers the end walls are returned to their vertical positions under spring pressure.

In operation the partitions 12 and the bottom walls 8 are arranged as illustrated in Figures 2 and 3 and the cores 40 are subsequently inserted into the several plastic receiving compartments. The several compartments are now filled with the plastic and at the proper time the cores 40 are removed by rotating the crank 48 in a clockwise direction and as previously stated when the shaft 44 reaches the limit of its outward movement the lugs 53 will engage the levers 55 and thereby swing the same on their pivots for swinging the end walls 18 outwardly. The drum 22 is now rotated in a counter-clockwise direction for spreading or separating the bottom walls 8 and collapsing the double-thickness partitions. As the bottom walls move over the polygonal drum 11 the blocks are discharged onto the receiver 30 and the bottom walls and partitions move between the guides 31. When it is desired to return the plates and partition walls to the top of the machine the drum 34 is rotated in a counter-clockwise direction. Subsequent to this the drum 34 is released from driving engagement with the lower drum 22 and the drum 22 is rotated in a clockwise direction for positioning the partitions as illustrated in Figure 3.

When the partitions thus positioned for defining the several plastic receiving compartments the cores may be inserted by rotation of the shaft 48 and the consequent movement of the gears 36 on the racks 47.

As illustrated in Figure 6 the machine forming the subject matter of this application is capable of use in the manufacture of plaster boards and in that case the several compartments are partly filled with filler blocks 100 so as to leave shallow compartments adapted for the reception of a plastic whereby the plastic poured into the said shallow compartments defines plaster boards. Various thickness of plaster boards may be manufactured by varying the thickness of the filler blocks and during the manufacture of plaster board the several cores 40 are arranged in their inoperative positions. Of course, the machine is provided with guides by means of which the cores 40 are accurately guided into place.

Having thus described the invention, what is claimed is:—

1. A molding machine comprising a frame, a plurality of bottom walls extending transversely of the machine, partition walls hinged to the bottom walls and means whereby to collapse the partition walls and move the same together with the bottom walls longitudinally of the machine.

2. A molding machine comprising a frame having guide strips, bottom walls guided by said guide strips, partition walls arranged in pairs and having their opposed edges hingedly connected and having their other edges connected to the edges of said bottom walls, and means whereby to move said bottom walls and said partitions along the frame to a discharge point.

3. A molding machine comprising a frame having guide means, bottom walls mounted on the frame and guided by said guide means, pairs of partitions having their adjacent edges hingedly connected and having their outer edges hingedly connected to said bottom walls, said partitions being adapted to cooperate with said bottom walls in defining compartments, and means connected to one end of the bottom walls for collapsing the partitions and subsequently arranging the same in their operative positions.

4. A molding machine comprising a frame, a plurality of bottom walls mounted upon the frame, pairs of partitions arranged between the bottom walls and having their adjacent edges hingedly connected and their outer edges hinged to said bottom walls, said partitions being adapted to be arranged on edge to define compartments and being adapted to collapse for separating the bottom walls and the blocks carried thereby, rollers arranged at the ends of said frame, a cable connected to one end of the series of bottom walls and trained about said rollers for separating the bottom walls and collapsing the partitions, and a second cable trained about one of the rollers and to the connected series of bottom walls and adapted for returning the partitions to their operative positions.

5. A molding machine comprising a frame, a series of bottom walls carried thereby, pairs of partitions arranged between the bottom walls and having means whereby the same are supported in slightly inclined positions when collapsed, and cables connected to the series of bottom walls for moving the series of bottom plates longitudinally of the frame and for returning the same to their operative positions.

6. A molding machine comprising a frame, a series of bottom walls carried thereby, pairs of partitions arranged between the bottom walls and having means whereby the same are supported in slightly inclined positions when collapsed, cables connected to the series of bottom walls for moving the series of bottom plates longitudinally of the frame and for returning the same to their operative positions, end walls hinged to the frame and adapted to contact with the ends of said partitions whereby to cooperate with the same in defining compartments, and means whereby to swing the end walls outwardly.

7. A molding machine comprising a frame, a series of bottom walls carried thereby, pairs of partitions arranged between the bottom walls and having means whereby the same are supported in slightly inclined positions when collapsed, cables connected to the series of bottom walls for moving the series of bottom plates longitudinally of the frame and for returning the same to their operative positions, end walls hinged to the frame and adapted to contact with the ends of said partitions whereby to cooperate with the same in defining compartments, means whereby to swing the end walls outwardly, and cores received in said compartments to define openings in the blocks formed.

8. A molding machine comprising a frame, block supporting means carried thereby, end walls hinged to the frame, cores passed through said end walls, an operating shaft loosely connected to said cores, gears carried by said operating shaft, racks supporting said gears, contact lugs operated by said gears, and means connected to said end walls and arranged in the path of travel of said lugs whereby the engagement of the lugs with said means swings the walls outwardly simultaneously with the removal of the cores.

9. A molding machine comprising a frame, block supporting means carried thereby, end walls hinged to the frame, a lever pivoted intermediate its ends to the frame and having means connected to said end walls, cores adapted for movement through said end walls, and having heads provided with U-bolts, a core controlled shaft passed through said U-bolts and having gears, racks supporting said gears, contact members carried by said gears, a pair of levers connected intermediate their ends to the frame and having curved terminal portions arranged in the path of travel of said contact members whereby the levers are swung when engaged by the contact members, means connecting the lever to said hinged end walls whereby the end walls are swung outwardly when the contact members are engaged with the curved terminal portions of said levers, and a discharge mechanism for the blocks.

10. A molding machine comprising a frame, having pairs of strips constituting guides, a series of bottom walls having their ends guided by said strips, pairs of partitions hinged to said bottom walls, a drum of polygonal formation arranged at one end of the frame for the passage of said bottom walls and said partitions, a drum carried by said frame and having a cable connected to said series of bottom walls for moving the same about said polygonal drum, and a return cable trained about said second named drum and connected to said bottom walls for returning the same to their operative positions.

JAMES FREDRICK CALDWELL.